US011975352B2

(12) United States Patent
Trexler et al.

(10) Patent No.: US 11,975,352 B2
(45) Date of Patent: May 7, 2024

(54) COMPOSITION APPLICATOR TIP AND INSTRUMENTATION

(71) Applicant: SEM Products, Inc., Rock Hill, SC (US)

(72) Inventors: Larry Trexler, Fort Mill, SC (US); Zachary Pellarin, Matthews, NC (US); Thomas Widmer, Swansea, SC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 17/260,935

(22) PCT Filed: Jul. 16, 2019

(86) PCT No.: PCT/US2019/042037
§ 371 (c)(1),
(2) Date: Jan. 15, 2021

(87) PCT Pub. No.: WO2020/018561
PCT Pub. Date: Jan. 23, 2020

(65) Prior Publication Data

US 2021/0283646 A1 Sep. 16, 2021

Related U.S. Application Data

(60) Provisional application No. 62/698,335, filed on Jul. 16, 2018.

(51) Int. Cl.
*B05C 17/005* (2006.01)

(52) U.S. Cl.
CPC .. *B05C 17/00516* (2013.01); *B05C 17/00553* (2013.01); *B05C 17/00513* (2013.01)

(58) Field of Classification Search
CPC ........ B05C 17/00516; B05C 17/00553; B05C 17/00513
(Continued)

(56) References Cited

U.S. PATENT DOCUMENTS 4,101,077 A * 7/1978 Gibson ............... B05C 17/0052 239/598
2007/0127978 A1* 6/2007 Park ........................ B43M 11/02 401/268
(Continued)

FOREIGN PATENT DOCUMENTS

KR 101675391 B1 11/2016

*Primary Examiner* — Paul R Durand
*Assistant Examiner* — Michael J. Melaragno

(57) ABSTRACT

A composition applicator tip adapted to deliver a “rippled” bead of composition to a surface of a substrate, the composition applicator tip including: a hollow conduit structure defining a pair of opposed openings and adapted to deliver the composition there through, wherein a first opening of the pair of opposed openings is adapted to be coupled to a composition delivery vessel; and an end wall enclosing a second opening of the pair of opposed openings, wherein the end wall defines an elongate slot that is adapted to be disposed substantially parallel to the surface of the substrate in use and expel the composition there through, and wherein a portion of the end wall disposed beneath the elongate slot has a height such that the composition falls by gravity a predetermined distance to the surface of the substrate in use as the composition applicator tip is translated along the surface of the substrate.

20 Claims, 13 Drawing Sheets

(58) Field of Classification Search
USPC .......................................................... 222/145.5
See application file for complete search history.

(56) References Cited

U.S. PATENT DOCUMENTS

| | | | | |
|---|---|---|---|---|
| 2012/0091172 | A1* | 4/2012 | Maier | B05C 17/00513 222/566 |
| 2012/0168469 | A1* | 7/2012 | Schwarze | B05C 17/00503 222/568 |
| 2013/0126558 | A1* | 5/2013 | Schneider | B65D 25/48 222/330 |
| 2014/0124536 | A1* | 5/2014 | Pappalardo | B05C 17/00553 222/137 |
| 2014/0158717 | A1* | 6/2014 | Ettlin | B05C 17/00559 222/327 |
| 2015/0129615 | A1* | 5/2015 | Bates | B65D 81/325 222/145.5 |
| 2015/0291339 | A1* | 10/2015 | Leue | B05C 17/00506 222/136 |
| 2017/0120206 | A1* | 5/2017 | Hiemer | B01F 5/0658 |
| 2018/0229260 | A1* | 8/2018 | Lavelanet | B05C 17/00553 |

* cited by examiner

COMPOSITION APPLICATOR TIP AND INSTRUMENTATION

CROSS-REFERENCE TO RELATED APPLICATION

The present disclosure claims the benefit of priority of U.S. Provisional Patent Application No. 62/698,335, filed on Jul. 16, 2018, and entitled "COMPOSITION APPLICATOR TIP AND INSTRUMENTATION," the contents of which are incorporated in full by reference herein.

TECHNICAL FIELD

The present disclosure relates generally to sealing processes and adhesive technologies. More particularly, the present disclosure relates to applicator tips and instrumentation for sealing compositions, especially for use in automotive, marine, and aviation applications, among others.

BACKGROUND

As chemical adhesive technologies progress, for example, becoming even stronger than steel bolts in metal-to-metal joining applications within the automotive industry, glues and other compositions are increasingly used in the manufacturing process. Factory-based implementation of massive assembly lines, utilizing the latest robotics, may fine tune production streams based on exact, optimized cure times of proprietary adhesives. This equipment may be designed to automatically dispense and/or spray compositions on substrates in patterns and layouts developed for ideal surface area coverage, visual aesthetics, etc. In downstream repair or aftermarket applications, however, users do not have the benefit of applying sensitive chemicals to parts using expensive machinery, programmed with precise specifications for pressure, flow, volume, temperature, timing, positioning, viscosity, etc. Thus, implementation often falls short of original equipment manufacturers capabilities, and this mismatch may be easily observed, such as in a repair assessment or insurance context. Those who are able to replicate desired results without industrial-grade instrumentation may have heavily invested time in skills development and/or cannot guarantee consistency. Therefore, there is a need for better ways to utilize factory application techniques without industrial machinery that do not add time or material costs to repair or aftermarket restoration practices.

One such example is the application of beads of seam sealer along the internal seams of a vehicle. Many manufacturers utilize a distinctive "rippled" bead that is formed by factory equipment. When an aftermarket shop repairs a vehicle, it is very difficult and time consuming to replicate this "rippled" bead by hand using a one or two-part composition, and the quality of the results may vary greatly. As a result, even a casual observation can determine that a vehicle has been wrecked and repaired based on the lack or poor quality of the manual "rippled" bead.

SUMMARY

Accordingly, the present disclosure is devoted to improved devices and methods for applying sealants or other compositions in aftermarket or downstream repair settings. Disclosed herein are ways in which prepared or mixed adhesives or epoxy compositions may be applied using applicator tips and instrumentation for sealing and/or joining operations. For example, two-part adhesives or sealants that have been mixed in preparation for curing may require a minimum height or surface area for adequate coverage, contact, and/or air exposure when applied to part surfaces or substrates in order to create a proper seal and provide a desired appearance.

The devices and methods of the present disclosure allow for an enhanced flow and application of adhesives and/or other compositions when laid into beads, especially along a seam or the like. More specifically, the present disclosure relates to applicator tips and instrumentation configured to adaptably fit onto conventional epoxy nozzles/outlets and shaped with advanced geometries at the openings that allow for enhanced outflow patterns.

In various exemplary aspects, the present disclosure provides composition applicator tips that may be attached to one or two-part composition (sealant, epoxy, etc.) delivery tubes with or without an intervening mixing nozzle. These composition applicator tips have specially designed end sections that may be held at multiple angles with respect to a substrate surface and allow the composition used to "fall" by gravity to the substrate surface and "fold" as the composition applicator tips are translated along the substrate surface, such as along a seam to be sealed. This approximates cake batter being "folded" out of a pan and onto a sheet, for example. This creates a "rippled" effect that closely approximates a factory seam seal, for example, as the composition sets up. The height and width of the "ripples" can be adjusted by selecting an appropriate composition applicator tip and varying the composition expulsion rate and translation speed, all with minimal effort on the part of the technician. In general, the end sections of the composition applicator tips include a slot through which the composition used is expelled and, optionally, either a dome structure or a flat structure. The dome structure is useful for creating a "rippled" bead with a smooth center section, for example, which is utilized by some automotive manufacturers.

In one exemplary aspect, the present disclosure provides a composition applicator tip adapted to deliver a "rippled" bead of composition to a surface of a substrate, the composition applicator tip including: a hollow conduit structure defining a pair of opposed openings and adapted to deliver the composition there through, wherein a first opening of the pair of opposed openings is adapted to be coupled to a composition delivery vessel; and an end wall enclosing a second opening of the pair of opposed openings, wherein the end wall defines an elongate slot that is adapted to be disposed substantially parallel to the surface of the substrate in use and expel the composition there through, and wherein a portion of the end wall disposed beneath the elongate slot has a height such that the composition falls by gravity a predetermined distance to the surface of the substrate in use as the composition applicator tip is translated along the surface of the substrate.

In another exemplary aspect, the present disclosure provides a composition delivery vessel adapted to deliver a "rippled" bead of composition to a surface of a substrate, the composition delivery vessel including: one or more composition storage vessels adapted to collectively contain the composition; and a composition applicator tip coupled to the one or more composition storage vessels, the composition applicator tip including: a hollow conduit structure defining a pair of opposed openings and adapted to deliver the composition there through, wherein a first opening of the pair of opposed openings is adapted to be coupled to the one or more composition storage vessels; and an end wall enclosing a second opening of the pair of opposed openings, wherein the end wall defines an elongate slot that is adapted to be disposed substantially parallel to the surface of the substrate in use and expel the composition there through, and wherein a portion of the end wall disposed beneath the elongate slot has a height such that the composition falls by gravity a predetermined distance to the surface of the substrate in use as the composition applicator tip is translated along the surface of the substrate.

In a further exemplary aspect, the present disclosure provides a composition application method for delivering a "rippled" bead of composition to a surface of a substrate, the composition application method including: providing a composition delivery vessel including one or more composition storage vessels adapted to collectively contain the composition and a composition applicator tip coupled to the one or more composition storage vessels, the composition applicator tip including: a hollow conduit structure defining a pair of opposed openings and adapted to deliver the composition there through, wherein a first opening of the pair of opposed openings is adapted to be coupled to the one or more composition storage vessels; and an end wall enclosing a second opening of the pair of opposed openings, wherein the end wall defines an elongate slot that is adapted to be disposed substantially parallel to the surface of the substrate in use and expel the composition there through, and wherein a portion of the end wall disposed beneath the elongate slot has a height such that the composition falls by gravity a predetermined distance to the surface of the substrate in use as the composition applicator tip is translated along the surface of the substrate; and expelling the composition from the hollow conduit structure and the elongate slot while holding the composition applicator tip at a predetermined angle and translating the composition applicator tip linearly or curvilinearly along the surface of the substrate.

BRIEF DESCRIPTION OF THE DRAWINGS

The present disclosure is illustrated and described herein with reference to the various drawings, in which like reference numbers are used to denote like device components/method steps, as appropriate, and in which.

DETAILED DESCRIPTION

Again, the present disclosure is devoted to improved devices and methods for applying sealants or other compositions in aftermarket or downstream repair settings. Disclosed herein are ways in which prepared or mixed adhesives or epoxy compositions may be applied using applicator tips and instrumentation for sealing and/or joining operations. For example, two-part adhesives or sealants that have been mixed in preparation for curing may require a minimum height or surface area for adequate coverage, contact, and/or air exposure when applied to part surfaces or substrates in order to create a proper seal and provide a desired appearance. As used herein, "composition" is used broadly and refers to any sealant, adhesive, epoxy composition, or the like.

The devices and methods of the present disclosure allow for an enhanced flow and application of adhesives and/or other compositions when laid into beads, especially along a seam or the like. More specifically, the present disclosure relates to applicator tips and instrumentation configured to adaptably fit onto conventional epoxy nozzles/outlets and shaped with advanced geometries at the openings that allow for enhanced outflow patterns. As used herein, "bead" is used broadly and refers to any elongate, thin line of continuous material.

In various exemplary aspects, the present disclosure provides composition applicator tips that may be attached to one or two-part composition (sealant, epoxy, etc.) delivery tubes with or without an intervening mixing nozzle. These composition applicator tips have specially designed end sections that may be held at multiple angles with respect to a substrate surface and allow the composition used to "fall" by gravity to the substrate surface and "fold" as the composition applicator tips are translated along the substrate surface, such as along a seam to be sealed. This approximates cake batter being "folded" out of a pan and onto a sheet, for example. This creates a "rippled" effect that closely approximates a factory seam seal, for example, as the composition sets up. The height and width of the "ripples" can be adjusted by selecting an appropriate composition applicator tip and varying the composition expulsion rate and translation speed, all with minimal effort on the part of the technician. In general, the end sections of the composition applicator tips include a slot through which the composition used is expelled and, optionally, either a dome structure or a flat structure. The dome structure is useful for creating a "rippled" bead with a smooth center section, for example, which is utilized by some automotive manufacturers. As used herein, "substrate" is used broadly and refers to any metallic surface, fiberglass surface, plastic surface, or the like used in any application, with an automotive application being one example only.

Figure 1:
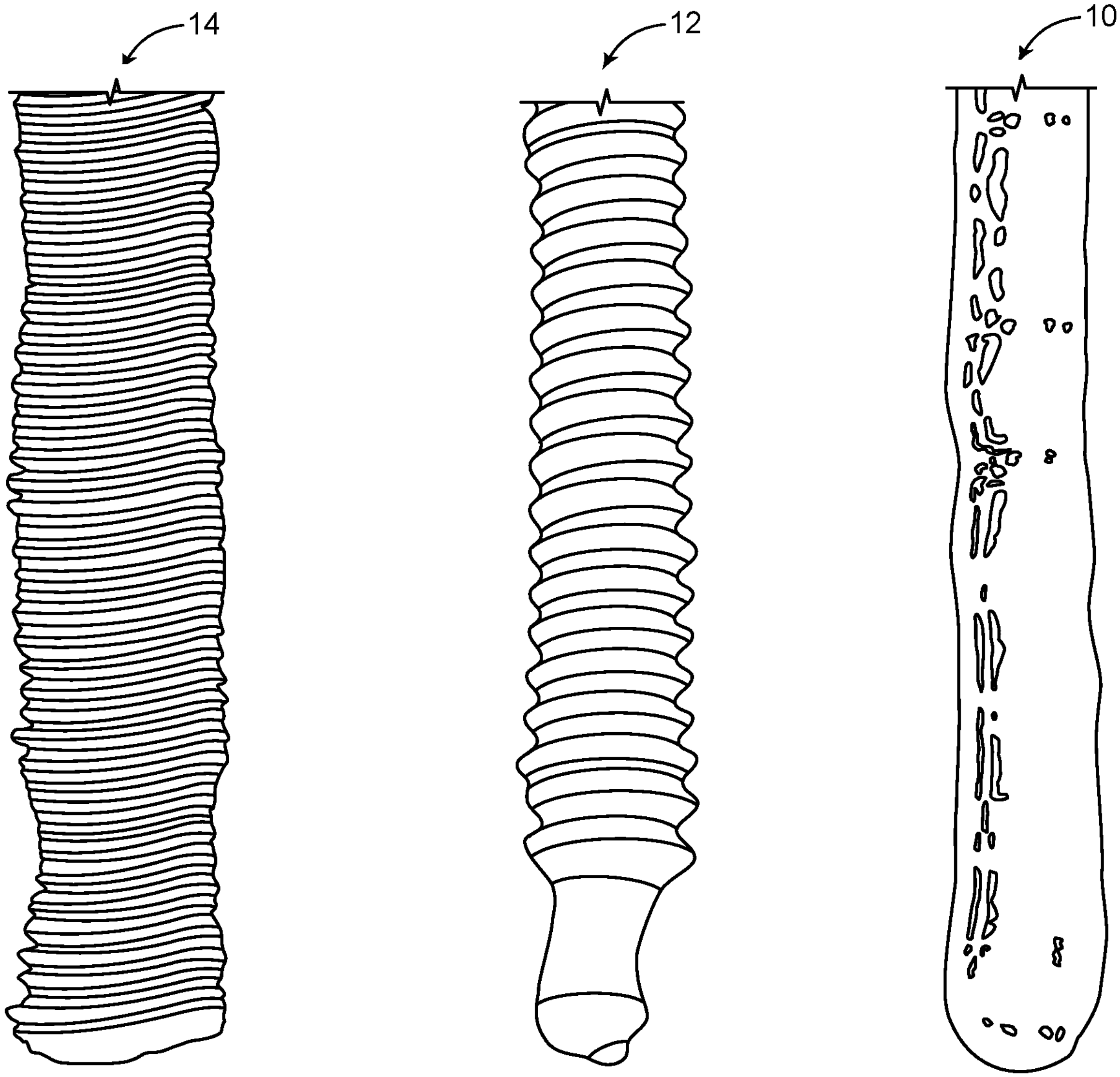
FIG. 1 is a series of images illustrating "rippled" seam seals utilized by automotive manufacturers and formed using the composition applicator tips of the present disclosure.

FIG. 1 illustrates a bead 10 of seam sealant or another composition applied using a conventional composition applicator tip. This bead 10 is rather smooth and amorphous. In contrast, beads 12,14 of seam sealant or another composition applied using the composition applicator tip of the present disclosure are also illustrated. These beads 12,14 are "folded" during application, creating a distinctive "rippling" effect. These latter beads 12,14, which are manually applied, intentionally match the machine-applied beads utilized by original equipment manufacturers (OEMs) in the factory. Mimicking such beads 12,14 using a conventional composition applicator tip otherwise requires great skill and patience on the part of a technician, requiring the conventional applicating tip to be oscillated as it is translated across the workpiece. This requires training and practice. The composition applicator tip of the present disclosure solves this problem, providing "rippled" beads 12,14 with quick and smooth (and reproducible) technician movements, which require minimal training. It should be noted that the width and depth of the "ripples" of the present disclosure are dependent upon several very-controllable factors, including, but not limited to, nozzle/slot width, nozzle/slot height, tool angle, composition viscosity, and composition application rate/pressure.

Figure 2:
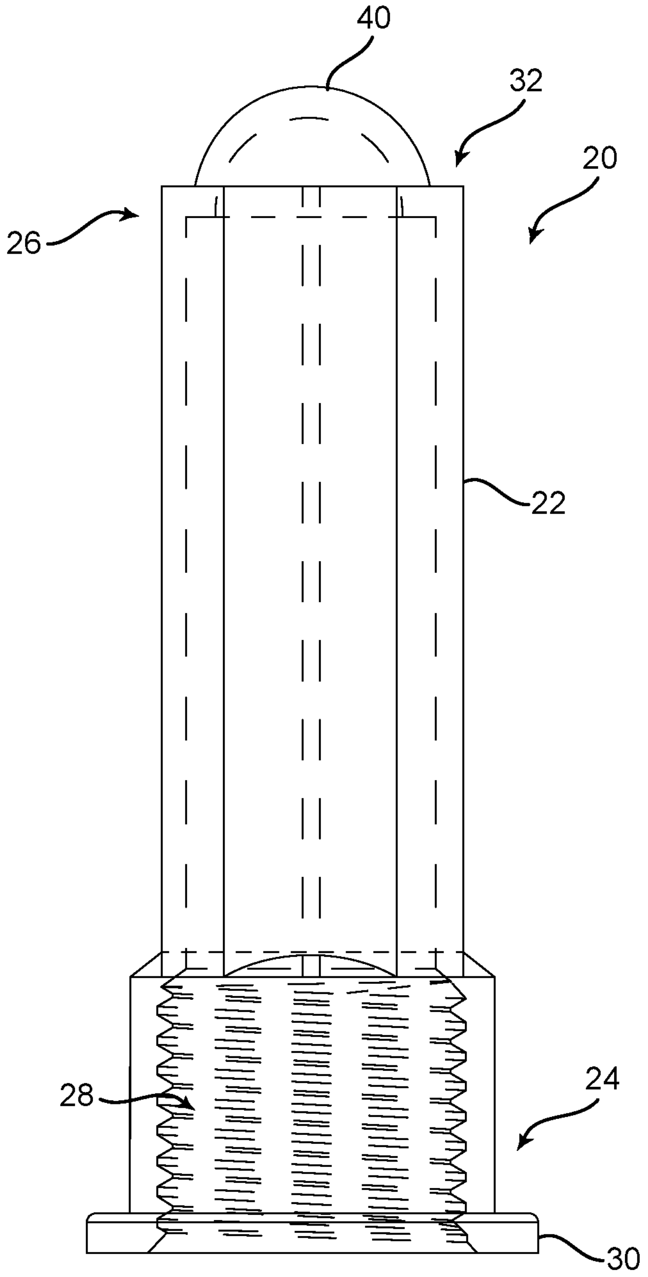
FIG. 2 is a side planar view of one exemplary aspect of the composition applicator tip of the present disclosure.
Figure 3:
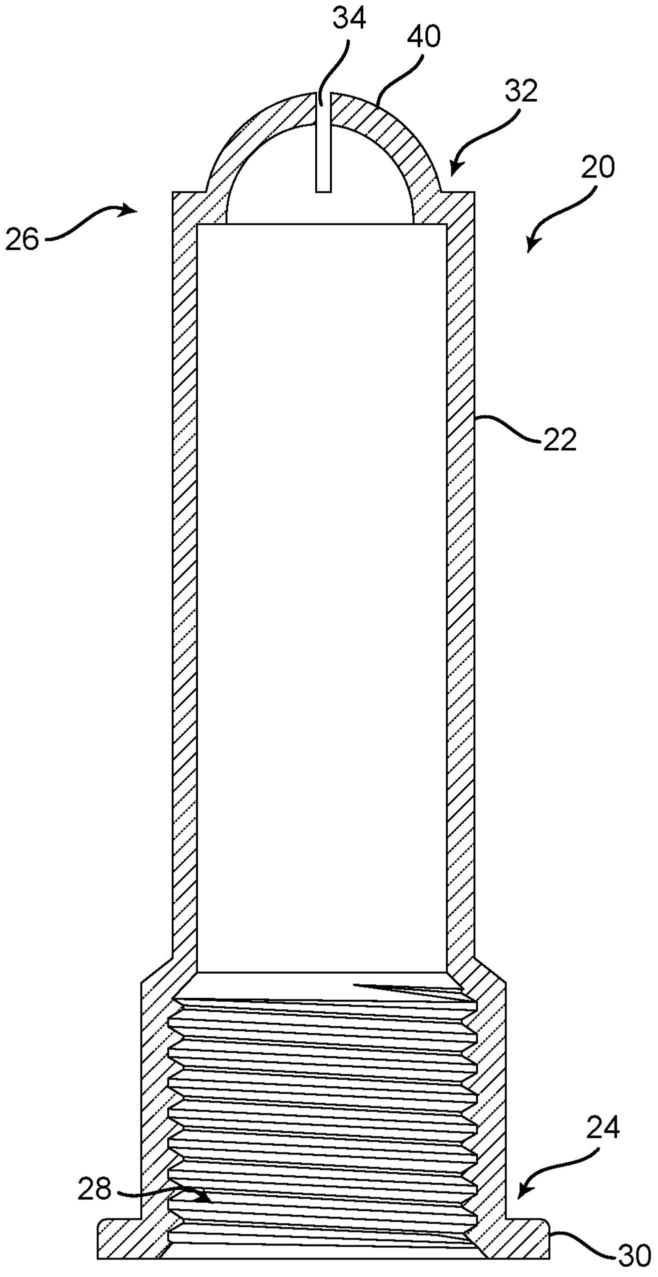
FIG. 3 is a cross-sectional side view of one exemplary aspect of the composition applicator tip of the present disclosure.
Figure 4:
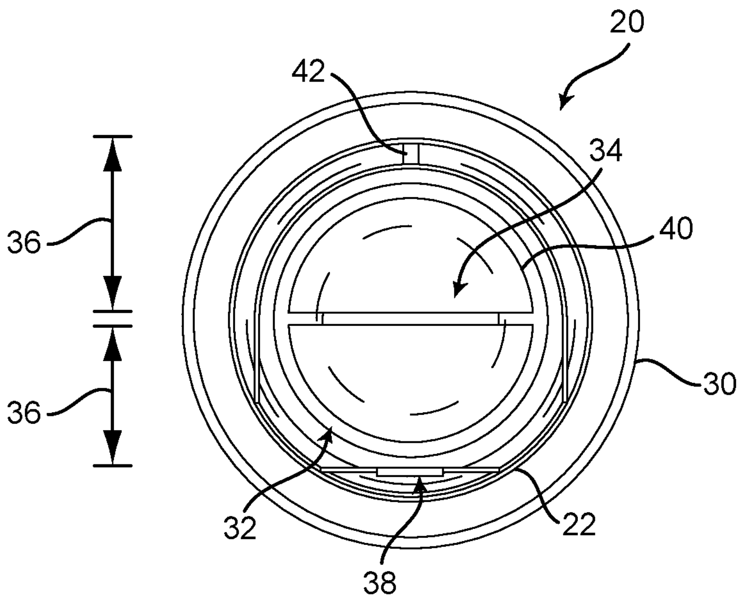
FIG. 4 is a planar end view of one exemplary aspect of the composition applicator tip of the present disclosure.

FIGS. 2-4 illustrate one exemplary aspect of the composition applicator tip 20 of the present disclosure. This composition applicator tip 20 is adapted to deliver a "rippled" bead of composition to a surface of a substrate. The composition applicator tip 20 includes a hollow conduit structure 22 that defines a pair of opposed openings 24,26. The composition is delivered through the hollow conduit structure 22. The first opening 24 of the pair of opposed openings 24,26 is adapted to be coupled to a composition delivery vessel, such as a tube of one or two-part seam sealant or the like disposed in a delivery gun or the like, well known to those of ordinary skill in the art. An end of the hollow conduit structure 22 may include internal threads 28 and/or a retention flange 30 for this purpose. It should be noted that the composition applicator tip 20 is preferably made of an inexpensive plastic material or the like, such that it is single or limited-use and disposable. Alternatively, the composition applicator tip 20 may be fixedly attached to or integrally formed with the tube of seam sealant, for example.

An end wall 32 encloses the second opening 26 of the pair of opposed openings 24,26. The end wall 32 defines an elongate slot 34 that is fluidly coupled to the interior of the hollow conduit structure 22 and adapted to be disposed substantially parallel to the surface of the substrate in use and expel the composition there through. This elongate slot 34 may be a rectangular slot or the like and the width and thickness of the elongate slot 34, in part, defines the width and thickness of the bead 12,14 (FIG. 1) applied, as well as the "ripple" depth and character. The elongate slot 34 has a width substantially parallel to the surface of the substrate of between 5 mm and 50 mm and a thickness substantially perpendicular to the surface of the substrate of between 0.1 mm and 5 mm, although other suitable dimensions may of course be utilized. Optionally, the thickness of the elongate slot 34 may vary along the width of the elongate slot 34.

A portion 36 of the end wall 32 disposed beneath the elongate slot 34 in use has a height such that the composition falls by gravity a predetermined distance to the surface of the substrate as the composition applicator tip 20 is translated along the surface of the substrate. This height varies based on the contact point between the composition applicator tip 20 and the surface of the substrate, as well as the relative angle between the composition applicator tip 20 and the surface of the substrate, both of which are variable and based on the desired "rippled" bead 12,14 to be achieved. Optionally, the lower portion of the hollow conduit structure 22 defines a flat portion or ramp structure 38 that is adapted to contact the surface of the substrate in use and allows the composition applicator tip 20 to be disposed at one or more predetermined angles with respect to the surface of the substrate. This flat portion or ramp structure 38 may have any suitable shape for providing a predetermined angle and translating the composition applicator tip 20 is a steady and consistent manner with respect to the surface of the substrate.

Optionally, the end wall 32 defines a concave-outwards central dome structure 40 disposed about the elongate slot 34. In use, this central dome structure 40 is "dragged" through the "rippled" bead 12,14 as it is applied, creating a smooth central track along the "rippled" bead 12,14, mimicking the seam sealant bead utilized by some OEMs. Optionally, the upper or lower portion of the hollow conduit structure 22 also defines a fin structure 42 that is adapted to contact the surface of the substrate along a seam in use and allows the composition applicator tip 20 to be oriented with respect to the surface of the substrate as the composition applicator tip 20 is translated along the surface of the substrate and the seam. This fin structure 42 may be disposed on the same side of the composition applicator tip 20 as the flat portion or ramp structure 38, or the fin structure 42 and the flat portion or ramp structure 38 may be disposed on opposed sides of the composition applicator tip 20, for example.

It should be noted that the hollow conduit structure 22 may be a substantially-cylindrical structure or a prismatic structure having any suitable cross-sectional shape. This shape may efficiently integrate the flat portion or ramp structure 38 and other internal and external features.

Figure 5:
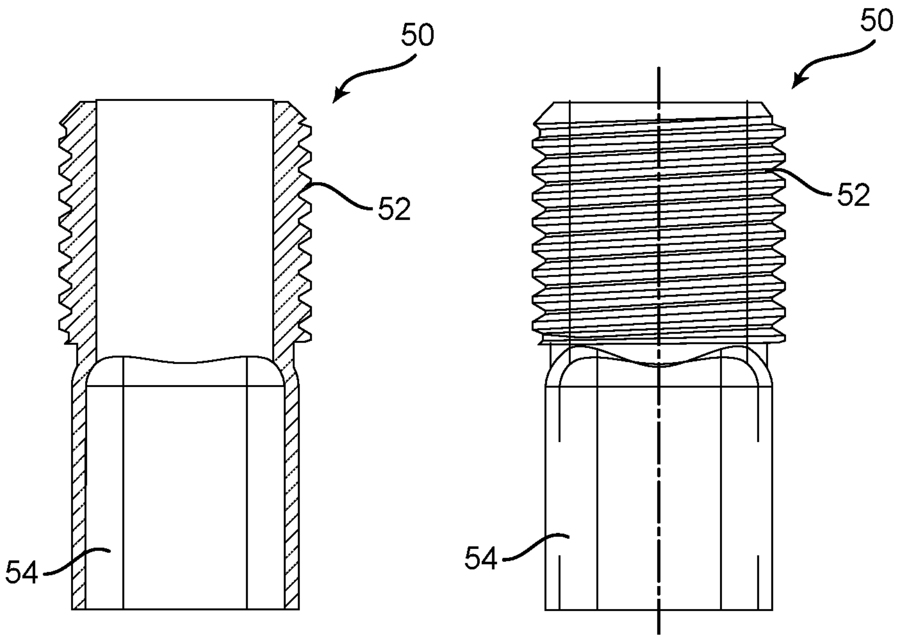
FIG. 5 is a cross-sectional side view and a side planar view of one exemplary aspect of an adapter utilized with the composition applicator tip of the present disclosure.

Referring now to FIG. 5, the first opening 24 (FIGS. 2 and 3) of the pair of opposed openings 24,26 (FIGS. 2 and 3)) of the hollow conduit structure 22 (FIGS. 2-4) is adapted to be coupled to one or more of a hollow adapter 50 and a static mixer adapted to be coupled to the composition delivery vessel. Optionally, the hollow conduit structure 22 itself includes one or more internal protruding structures that are adapted to statically mix the composition as the composition is delivered through the hollow conduit structure 22. When used, one end of the adapter 50 includes external threads 52 that are adapted to engage the internal threads 28 (FIGS. 2 and 3) of the hollow conduit structure 22, while an opposed end of the adapter 50 includes a square, rectangular, or cylindrical profile 54 that is adapted to conformally engage the static mixer nozzle used, for example. Thus, the adapter 50 acts as a coupler between the composition applicator tip 20 (FIGS. 2-4) and the static mixer nozzle and/or composition delivery vessel. It should be noted that, like the composition applicator tip 20, the adapter 50 is preferably made of an inexpensive plastic material or the like, such that it is single or limited-use and disposable.

Figure 6:
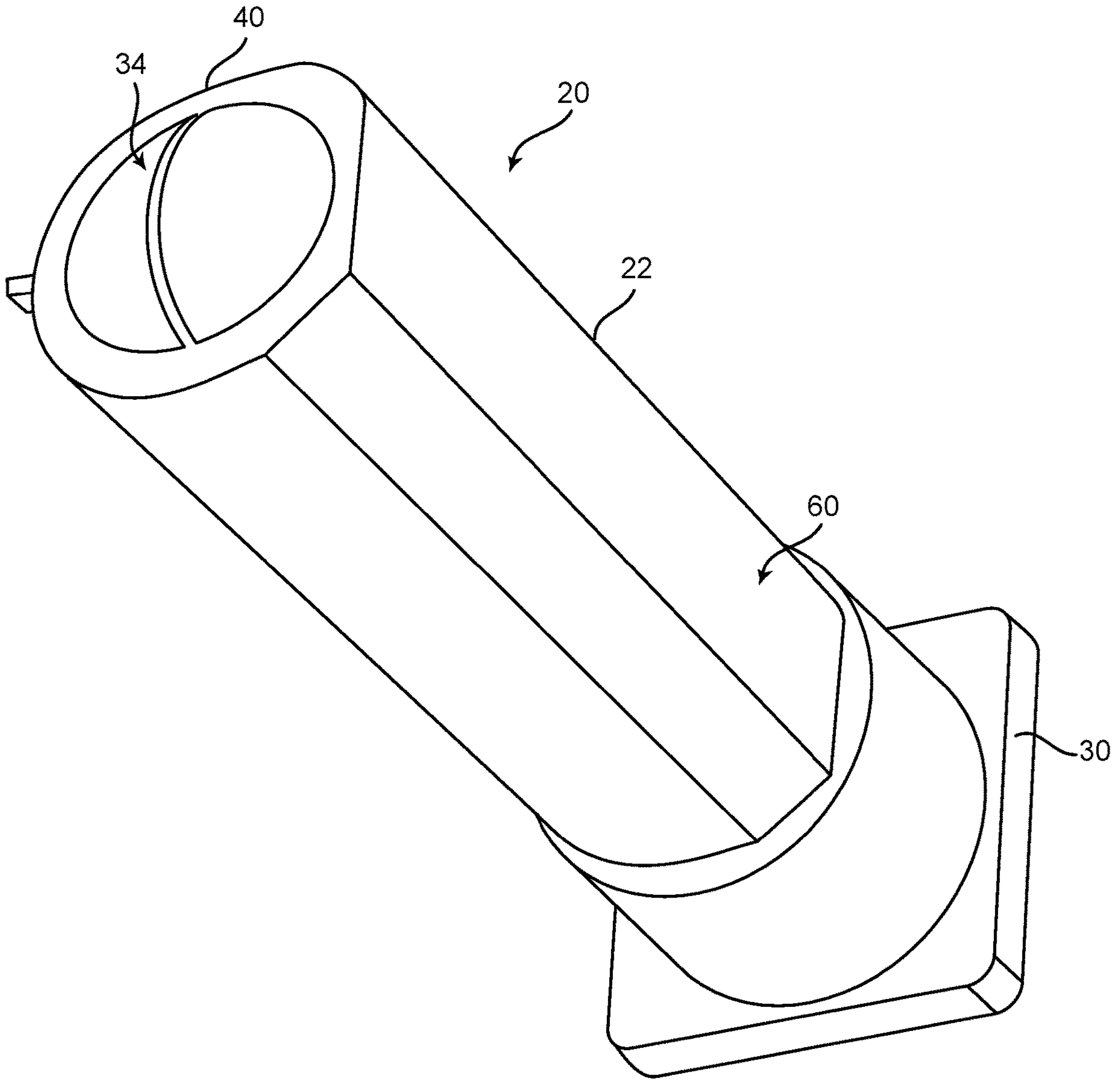
FIG. 6 is a perspective view of one exemplary aspect of the composition applicator tip of the present disclosure.

FIG. 6 is a perspective view of one exemplary aspect of the composition applicator tip 20 of the present disclosure, utilizing a dome structure 40 that partially or wholly defines the elongate slot 34, a retention flange 30 that is adapted to engage the composition delivery vessel, and one or more flat surfaces 60 associated with the hollow conduit structure 22 that enhance the functionality and appearance of the composition applicator tip 20.

Figure 7:
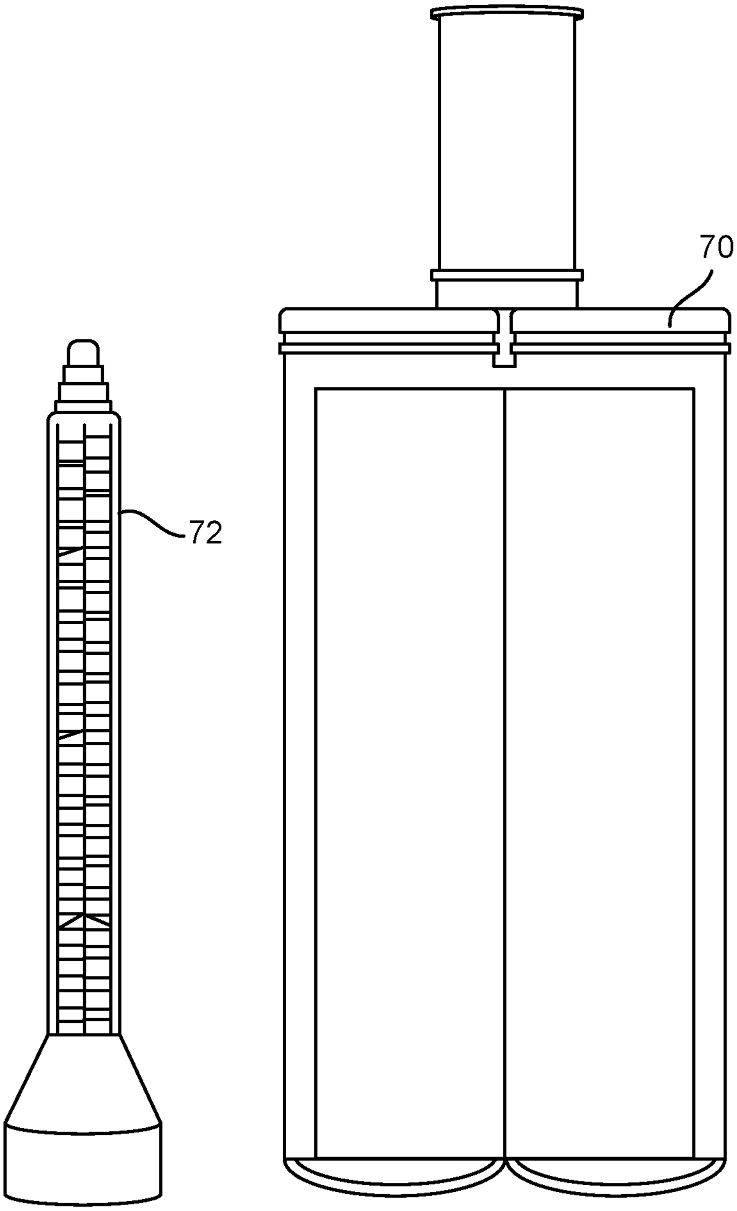
FIG. 7 is an image illustrating a tube of two-part seam sealer and a conventional mixing tip typically used with the composition applicator tip of the present disclosure.

FIG. 7 is an image illustrating a tube 70 of two-part seam sealer and a conventional mixing tip 72 typically used with the composition applicator tip 20 (FIGS. 2-4 and 6) of the present disclosure. As alluded to herein above, this tube 70 is likely fitted into a composition delivery gun or the like for the measured delivery of composition to the surface of the substrate by a technician.

Figure 8:
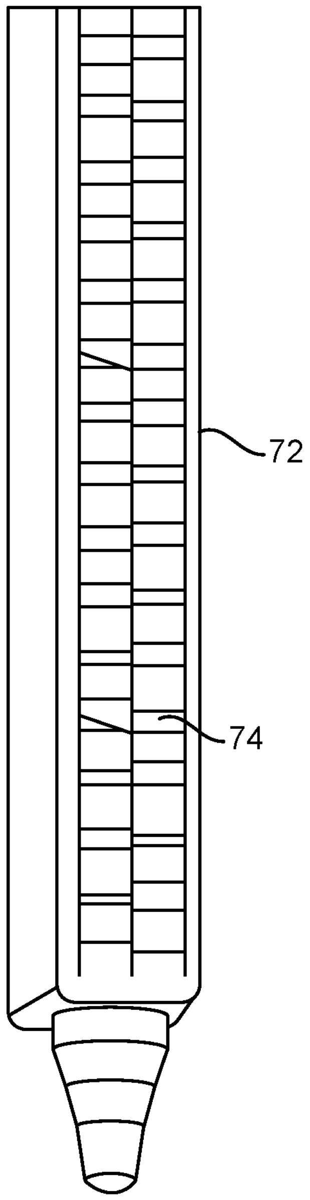
FIG. 8 is an image illustrating a conventional mixing tip typically used with the composition applicator tip of the present disclosure.

FIG. 8 is an image illustrating the conventional mixing tip 72 typically used with the composition applicator tip of the present disclosure. The mixing tip 72 includes a plurality of internal rib structures 74 that serve to the mix the composition as it is expelled through the mixing tip 72, especially in a two-part application.

Figure 9:
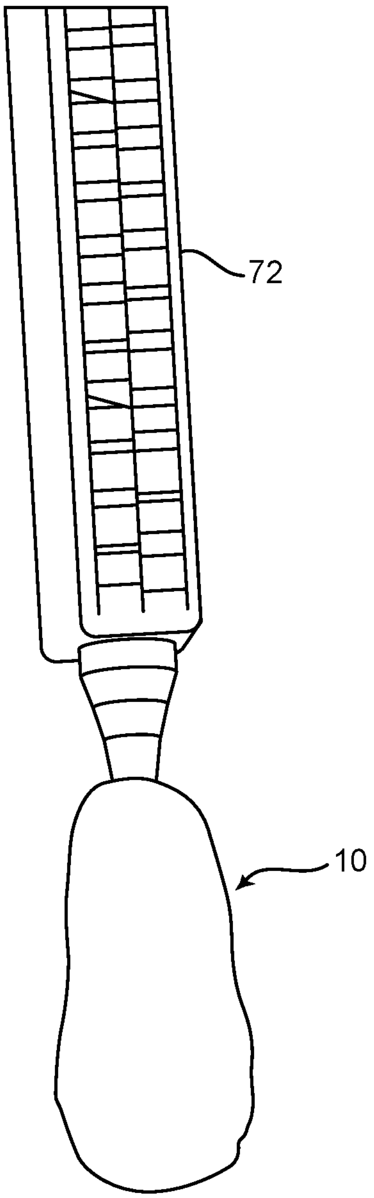
FIG. 9 is an image illustrating a conventional mixing tip typically used with the composition applicator tip of the present disclosure, the mixing tip being used to expel a bead of seam sealer.

FIG. 9 is an image illustrating the conventional mixing tip 72 typically used with the composition applicator tip 20 (FIGS. 2-4 and 6) of the present disclosure being used to expel a conventional smooth and amorphous bead 10 of seam sealer.

Figure 10:
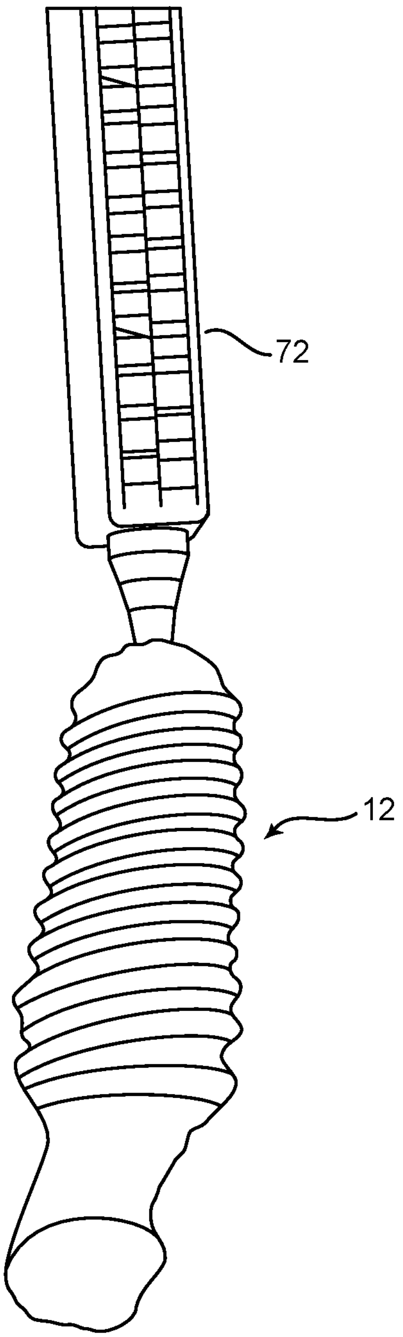
FIG. 10 is an image illustrating a conventional mixing tip typically used with the composition applicator tip of the present disclosure, the mixing tip being used to expel a bead of seam sealer in an oscillating manner in order to approximate a "rippled" bead in a time-consuming manual process.

FIG. 10 is an image illustrating the conventional mixing tip 72 typically used with the composition applicator tip 20 (FIGS. 2-4 and 6) of the present disclosure being used to expel a bead of seam sealer in an oscillating manner in order to approximate a "rippled" bead 12 in a time-consuming manual process. Such bead 12 is reproduced automatically utilizing the composition applicator tip 20 of the present disclosure.

Figure 11:
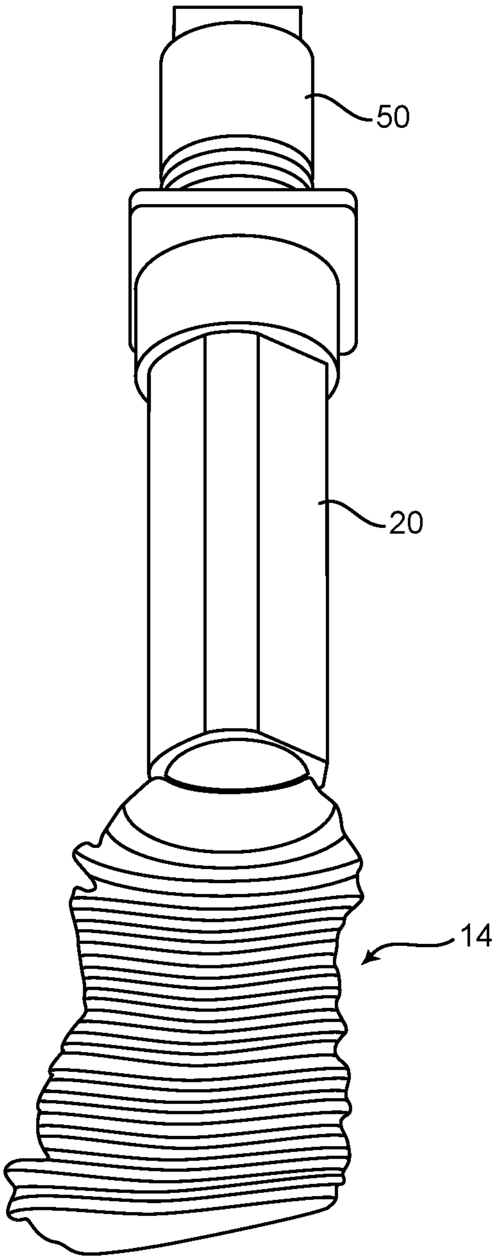
FIG. 11 is a perspective view of one exemplary aspect of the composition applicator tip of the present disclosure, the composition applicator tip being used to expel a "rippled" bead in an efficient manual process.

FIG. 11 is a perspective view of one exemplary aspect of the composition applicator tip 20 (and adapter 50) of the present disclosure being used to expel a "rippled" bead 14 in an efficient manual process, thereby replicating an OEM seam seal.

Figure 12:
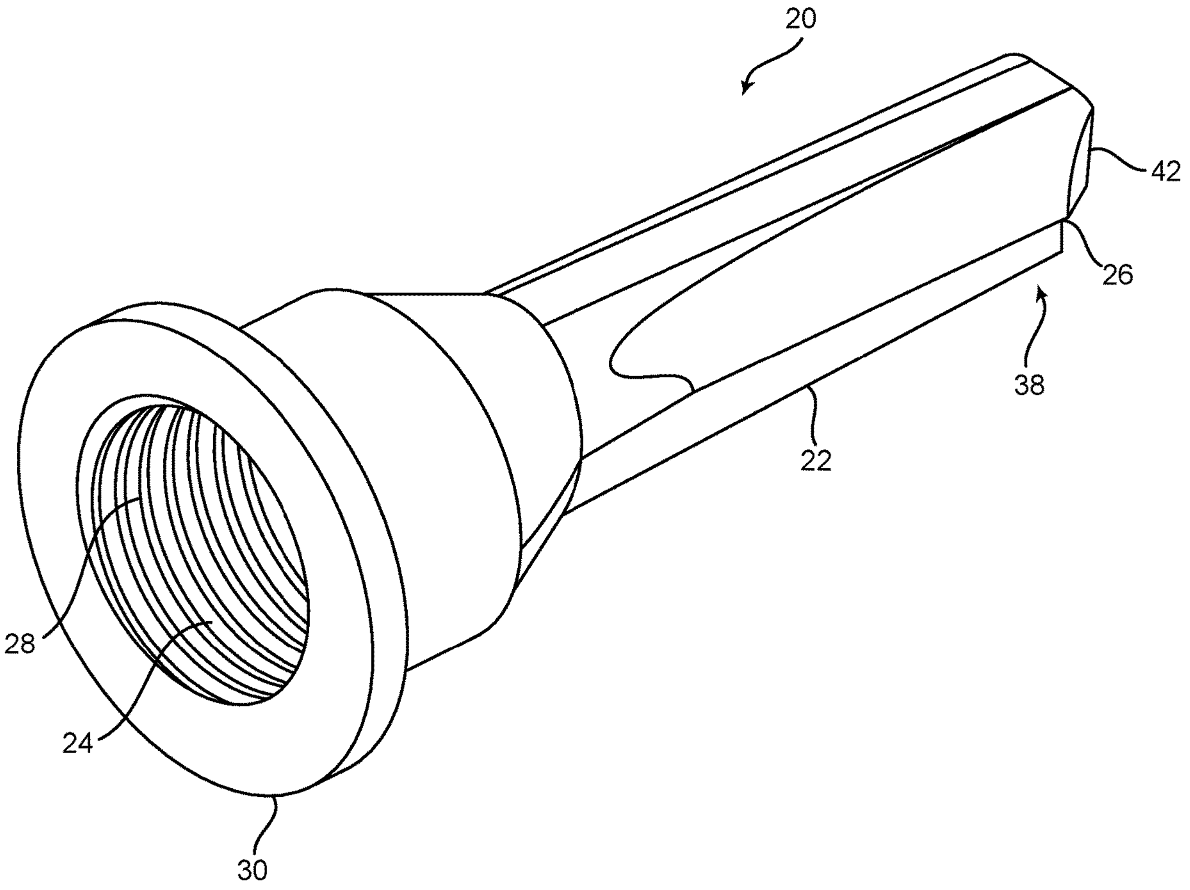
FIG. 12 is a perspective view of another exemplary aspect of the composition applicator tip of the present disclosure.
Figure 13:
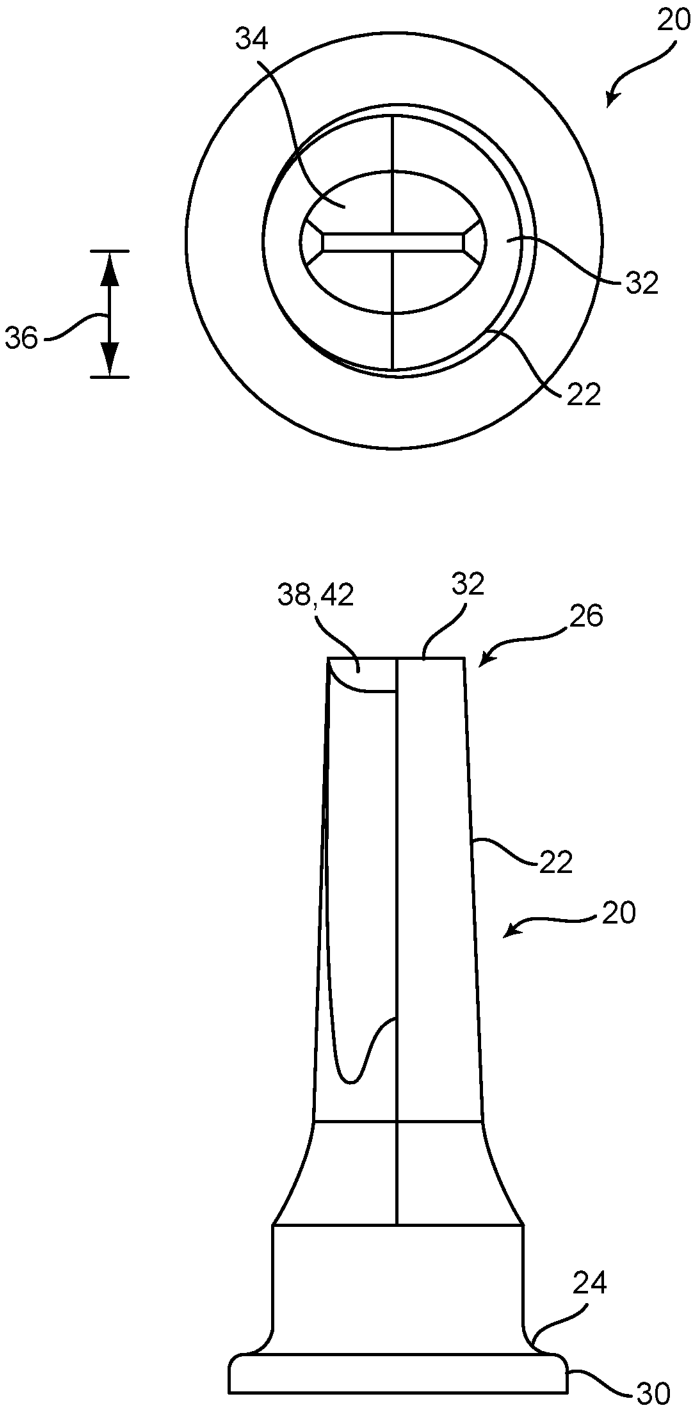
FIG. 13 is a planar side and end view of another exemplary aspect of the composition applicator tip of the present disclosure.

FIGS. 12 and 13 illustrate another exemplary aspect of the composition applicator tip 20 of the present disclosure. This composition applicator tip 20 is again adapted to deliver a "rippled" bead of composition to a surface of a substrate. The composition applicator tip 20 includes a hollow conduit structure 22 that defines a pair of opposed openings 24,26. The composition is delivered through the hollow conduit structure 22. The first opening 24 of the pair of opposed openings 24,26 is adapted to be coupled to a composition delivery vessel, such as a tube of one or two-part seam sealant or the like disposed in a delivery gun or the like, well known to those of ordinary skill in the art. An end of the hollow conduit structure 22 may include internal threads 28 and/or a retention flange 30 for this purpose. It should be noted that the composition applicator tip 20 is preferably made of an inexpensive plastic material or the like, such that it is single or limited-use and disposable. Alternatively, the composition applicator tip 20 may be fixedly attached to or integrally formed with the tube of seam sealant, for example.

Again, an end wall 32 encloses the second opening 26 of the pair of opposed openings 24,26. The end wall 32 defines an elongate slot 34 that is fluidly coupled to the interior of the hollow conduit structure 22 and adapted to be disposed substantially parallel to the surface of the substrate in use and expel the composition there through. This elongate slot 34 may be a rectangular slot or the like and the width and thickness of the elongate slot 34, in part, defines the width and thickness of the bead 12,14 (FIG. 1) applied, as well as the "ripple" depth and character. The elongate slot 34 has a width substantially parallel to the surface of the substrate of between 5 mm and 50 mm and a thickness substantially perpendicular to the surface of the substrate of between 0.1 mm and 5 mm, although other suitable dimensions may of course be utilized. Optionally, the thickness of the elongate slot 34 may vary along the width of the elongate slot 34.

A portion 36 of the end wall 32 disposed beneath the elongate slot 34 in use has a height such that the composition falls by gravity a predetermined distance to the surface of the substrate as the composition applicator tip 20 is translated along the surface of the substrate. This height varies based on the contact point between the composition applicator tip 20 and the surface of the substrate, as well as the relative angle between the composition applicator tip 20 and the surface of the substrate, both of which are variable and based on the desired "rippled" bead 12,14 to be achieved. Optionally, the lower portion of the hollow conduit structure 22 defines a flat portion or ramp structure 38 that is adapted to contact the surface of the substrate in use and allows the composition applicator tip 20 to be disposed at one or more predetermined angles with respect to the surface of the substrate. This flat portion or ramp structure 38 may have any suitable shape for providing a predetermined angle and translating the composition applicator tip 20 is a steady and consistent manner with respect to the surface of the substrate.

Optionally, the upper or lower portion of the hollow conduit structure 22 also defines a fin structure 42 that is adapted to contact the surface of the substrate along a seam in use and allows the composition applicator tip 20 to be oriented with respect to the surface of the substrate as the composition applicator tip 20 is translated along the surface of the substrate and the seam. This fin structure 42 may be disposed on the same side of the composition applicator tip 20 as the flat portion or ramp structure 38, or the fin structure 42 and the flat portion or ramp structure 38 may be disposed on opposed sides of the composition applicator tip 20, for example.

It should again be noted that the hollow conduit structure 22 may be a substantially-cylindrical structure or a prismatic structure having any suitable cross-sectional shape. This shape may efficiently integrate the flat portion or ramp structure 38 and other internal and external features.

Thus, again, the present disclosure is devoted to improved devices and methods for applying sealants or other compositions in aftermarket or downstream repair settings. Disclosed herein are ways in which prepared or mixed adhesives or epoxy compositions may be applied using applicator tips and instrumentation for sealing and/or joining operations. For example, two-part adhesives or sealants that have been mixed in preparation for curing may require a minimum height or surface area for adequate coverage, contact, and/or air exposure when applied to part surfaces or substrates in order to create a proper seal and provide a desired appearance.

The devices and methods of the present disclosure allow for an enhanced flow and application of adhesives and/or other compositions when laid into beads, especially along a seam or the like. More specifically, the present disclosure relates to applicator tips and instrumentation configured to adaptably fit onto conventional epoxy nozzles/outlets and shaped with advanced geometries at the openings that allow for enhanced outflow patterns.

In various exemplary aspects, the present disclosure provides composition applicator tips that may be attached to one or two-part composition (sealant, epoxy, etc.) delivery tubes with or without an intervening mixing nozzle. These composition applicator tips have specially designed end sections that may be held at multiple angles with respect to a substrate surface and allow the composition used to "fall" by gravity to the substrate surface and "fold" as the composition applicator tips are translated along the substrate surface, such as along a seam to be sealed. This approximates cake batter being “folded” out of a pan and onto a sheet, for example. This creates a “rippled” effect that closely approximates a factory seam seal, for example, as the composition sets up. The height and width of the “ripples” can be adjusted by selecting an appropriate composition applicator tip and varying the composition expulsion rate and translation speed, all with minimal effort on the part of the technician. In general, the end sections of the composition applicator tips include a slot through which the composition used is expelled and, optionally, either a dome structure or a flat structure. The dome structure is useful for creating a “rippled” bead with a smooth center section, for example, which is utilized by some automotive manufacturers.

Although the present disclosure is illustrated and described herein with reference to preferred aspects and specific examples thereof, it will be readily apparent to those of ordinary skill in the art that other aspects and examples may perform similar functions and/or achieve like results. All such equivalent aspects and examples are within the spirit and scope of the present disclosure, are contemplated thereby, and are intended to be covered by the following non-limiting claims for all purposes.

What is claimed is:

1. A composition applicator tip adapted to deliver a “rippled” bead of composition to a surface of a substrate, the composition applicator tip comprising:

a hollow conduit structure defining a pair of opposed openings and adapted to deliver the composition there through, wherein a first opening of the pair of opposed openings is adapted to be coupled to a composition delivery vessel; and an end wall enclosing a second opening of the pair of opposed openings, wherein the end wall defines an elongate slot that is adapted to be disposed substantially parallel to the surface of the substrate in use and expel the composition there through, and wherein a portion of the end wall disposed beneath the elongate slot has a height such that the composition falls by gravity a predetermined distance to the surface of the substrate in use as the composition applicator tip is translated along the surface of the substrate and wherein a lower portion of the hollow conduit structure defines a ramp structure comprising a flat surface that is adapted to contact the surface of the substrate in use and allows the composition applicator tip to be disposed at one or more predetermined angles with respect to the surface of the substrate wherein the lower portion of the hollow conduit structure further comprises a first substantially flat surface and a second substantially flat surface, wherein the each of the first substantially flat surface and the second substantially flat surface is adjacent to the flat surface of the ramp structure and wherein the first substantially flat surface and the second substantially flat surface each extends in a direction away from the flat surface of the ramp structure at different angles, wherein the end wall defines a concave-outwards central dome structure disposed about the elongate slot and wherein the elongate slot is spaced apart from the ramp structure by the portion of the end wall disposed beneath the elongate slot.

2. The composition applicator tip of claim 1, wherein a lower portion of the hollow conduit structure defines a fin structure that is adapted to contact the surface of the substrate along a seam in use and allows the composition applicator tip to be oriented with respect to the surface of the substrate as the composition applicator tip is translated along the surface of the substrate.

3. The composition applicator tip of claim 1, wherein the first opening of the pair of opposed openings of the hollow conduit structure is adapted to be coupled to one or more of an adapter and a static mixer adapted to be coupled to the composition delivery vessel.

4. The composition applicator tip of claim 1, wherein the hollow conduit structure comprises one or more internal protruding structures that are adapted to statically mix the composition as the composition is delivered through the hollow conduit structure.

5. The composition applicator tip of claim 1, wherein the elongate slot has a width substantially parallel to the surface of the substrate of between 5 mm and 50 mm.

6. The composition applicator tip of claim 1, wherein the hollow conduit structure defines a fin structure disposed on an opposite side of the hollow conduit structure than the ramp structure.

7. The composition applicator tip of claim 1, wherein the concave-outwards central dome structure of the end wall does not extend to the outer boundary edge of the hollow conduit structure.

8. A composition delivery vessel adapted to deliver a “rippled” bead of composition to a surface of a substrate, the composition delivery vessel comprising:

one or more composition storage vessels adapted to collectively contain the composition; and a composition applicator tip coupled to the one or more composition storage vessels, the composition applicator tip comprising:

a hollow conduit structure defining a pair of opposed openings and adapted to deliver the composition there through, wherein a first opening of the pair of opposed openings is adapted to be coupled to the one or more composition storage vessels; and an end wall enclosing a second opening of the pair of opposed openings, wherein the end wall defines an elongate slot that is adapted to be disposed substantially parallel to the surface of the substrate in use and expel the composition there through, and wherein a portion of the end wall disposed beneath the elongate slot has a height such that the composition falls by gravity a predetermined distance to the surface of the substrate in use as the composition applicator tip is translated along the surface of the substrate wherein a lower portion of the hollow conduit structure defines a ramp structure comprising a flat surface that is adapted to contact the surface of the substrate in use and allows the composition applicator tip to be disposed at one or more predetermined angles with respect to the surface of the substrate, wherein the lower portion of the hollow conduit structure further comprises a first substantially flat surface and a second substantially flat surface, wherein the each of the first substantially flat surface and the second substantially flat surface is adjacent to the flat surface of the ramp structure and wherein the first substantially flat surface and the second substantially flat surface each extends in a direction away from the flat surface of the ramp structure at different angles.

9. The composition delivery vessel of claim 8, wherein the end wall defines a concave-outwards central dome structure disposed about the elongate slot wherein the elongate slot comprises a rectangular shape and is substantially parallel to the flat surface of the ramp structure.

10. The composition delivery vessel of claim 8, wherein the hollow conduit structure defines a fin structure disposed on an opposite side of the hollow conduit structure than the ramp structure.

11. The composition delivery vessel of claim 10, wherein the fin structure is adapted to contact the surface of the substrate along a seam in use and allows the composition applicator tip to be oriented with respect to the surface of the substrate as the composition applicator tip is translated along the surface of the substrate.

12. The composition delivery vessel of claim 8, wherein the first opening of the pair of opposed openings of the hollow conduit structure is adapted to be coupled to one or more of an adapter and a static mixer adapted to be coupled to the composition delivery vessel.

13. The composition delivery vessel of claim 8, wherein the hollow conduit structure comprises one or more internal protruding structures that are adapted to statically mix the composition as the composition is delivered through the hollow conduit structure.

14. The composition delivery vessel of claim 8, wherein the elongate slot has a width substantially parallel to the surface of the substrate of between 5 mm and 50 mm.

15. A composition application method for delivering a "rippled" bead of composition to a surface of a substrate, the composition application method comprising:

providing a composition delivery vessel comprising one or more composition storage vessels adapted to collectively contain the composition and a composition applicator tip coupled to the one or more composition storage vessels, the composition applicator tip comprising:

a hollow conduit structure defining a pair of opposed openings and adapted to deliver the composition there through, wherein a first opening of the pair of opposed openings is adapted to be coupled to the one or more composition storage vessels; and an end wall enclosing a second opening of the pair of opposed openings, wherein the end wall defines an elongate slot that is adapted to be disposed substantially parallel to the surface of the substrate in use and expel the composition there through, and wherein a portion of the end wall disposed beneath the elongate slot has a height such that the composition falls by gravity a predetermined distance to the surface of the substrate in use as the composition applicator tip is translated along the surface of the substrate; and expelling the composition from the hollow conduit structure and the elongate slot while holding the composition applicator tip at a predetermined angle and translating the composition applicator tip linearly or curvilinearly along the surface of the substrate such that a rippled bead of composition is delivered to the surface of a substrate by folding the composition on the surface of the substrate, wherein the expelling the composition is manually applied.

16. The composition application method of claim 15, wherein the end wall defines a concave-outwards central dome structure disposed about the elongate slot, and wherein the elongate slot is spaced apart from the ramp structure by the portion of the end wall disposed beneath the elongate slot and wherein the elongate slot comprises a rectangular shape and is substantially parallel to the flat surface of the ramp structure.

17. The composition application method of claim 15, wherein a lower portion of the hollow conduit structure defines a fin structure that is adapted to contact the surface of the substrate along a seam in use and allows the composition applicator tip to be oriented with respect to the surface of the substrate as the composition applicator tip is translated along the surface of the substrate.

18. The composition application method of claim 15, further comprising providing one or more of an adapter and a static mixing section disposed between the one or more composition storage vessels and the composition applicator tip.

19. The method of claim 15, wherein the expelling the composition does not utilize a pneumatic system.

20. A composition applicator tip adapted to deliver a "rippled" bead of composition to a surface of a substrate, the composition applicator tip comprising:

a hollow conduit structure defining a pair of opposed openings and adapted to deliver the composition there through, wherein a first opening of the pair of opposed openings is adapted to be coupled to a composition delivery vessel; and an end wall enclosing a second opening of the pair of opposed openings, wherein the end wall defines an elongate slot that is adapted to be disposed substantially parallel to the surface of the substrate in use and expel the composition there through, and wherein a portion of the end wall disposed beneath the elongate slot has a height such that the composition falls by gravity a predetermined distance to the surface of the substrate in use as the composition applicator tip is translated along the surface of the substrate and wherein a lower portion of the hollow conduit structure defines a ramp structure comprising a flat surface that is adapted to contact the surface of the substrate in use and allows the composition applicator tip to be disposed at one or more predetermined angles with respect to the surface of the substrate, wherein the lower portion of the hollow conduit structure comprises three substantially flat surfaces, wherein each of the three substantially flat surfaces are disposed at different angles relative to the surface of the substrate.

* * * * *